(12) United States Patent
Mack et al.

(10) Patent No.: US 7,474,687 B1
(45) Date of Patent: Jan. 6, 2009

(54) STAGED CORRELATOR

(75) Inventors: Robert Mack, San Jose, CA (US); Peter Vavaroutsos, San Jose, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 772 days.

(21) Appl. No.: 11/015,105

(22) Filed: Dec. 17, 2004

Related U.S. Application Data

(60) Provisional application No. 60/532,752, filed on Dec. 23, 2003.

(51) Int. Cl.
*H04B 1/00* (2006.01)
(52) U.S. Cl. ............... 375/142; 375/150; 375/343
(58) Field of Classification Search ............ 375/142, 375/143, 147, 150, 152, 343
See application file for complete search history.

(56) References Cited

U.S. PATENT DOCUMENTS 6,064,695 A * 5/2000 Raphaeli .............. 375/230

* cited by examiner

*Primary Examiner*—David B Lugo
(74) *Attorney, Agent, or Firm*—Blakely, Sokoloff, Taylor & Zafman LLP

(57) ABSTRACT

A correlator has a feedback circuit having a first input coupled to an incoming data stream, a second input and an output. A data register is to store an incoming data stream having a number of candidate bits, the data register having an output coupled to the second input of the feedback circuit. A code register is to store a known code having a predetermined number of code bits and a comparator is to compare a portion of the incoming data stream to a portion of the known code.

20 Claims, 5 Drawing Sheets

STAGED CORRELATOR

This patent application claims priority from U.S. Provisional Application Ser. No. 60/532,752 filed Dec. 23, 2003.

BACKGROUND

1. Technical Field

This disclosure relates to electronic circuits, more particularly, to correlator circuits typically used in wireless communications.

2. Background

Spread spectrum systems use wide-band, low spectral density signals to transmit information wirelessly in such a manner as to make the signals appear to be noise. The term 'spread spectrum' refers to the fact that the transmitted signal bandwidth is greater than the information bandwidth, and the information signals are 'spread' across the transmitted signal bandwidth.

Spread spectrum signals use codes that dictate the manner in which the data transmission signals are spread across the spectrum used to transmit the signals. These codes may be referred to as pseudo-random noise (pseudo-noise) codes, because while they appear to be white noise, they are actually specific codes used to modulate the carrier signal at the transmitter and demodulate them at the receiver. Detection and analysis of the codes allows the codes to be used to identify data values, detect specific events, etc.

Currently, spread spectrum systems mainly follow one of two techniques of spreading. The first is usually referred to as direct sequence spread spectrum, or DSSS. The second technique of frequency spreading may be referred to as frequency hopping. Frequency hopping spread spectrum systems generally divide the available bandwidth into some number of channels and then hop between these channels according to the pseudo-noise code.

In order for these spread spectrum systems to work, both the transmitter and the receiver need to use the same pseudo-noise codes. Currently, a receiver responds to a small set of known pseudo-noise codes using a piece of dedicated hardware called a correlator with storage for the reference codes.

Generally, a correlation function generates a comparison of a full 64-bit reference code against an over sampled received input stream at every clock and then counting the bit matches. A high or low peak occurs in the match count when the two overlap. Supporting multiple pseudo-noise codes requires comparison of multiple 64-bit reference codes for each sample point of the received input stream.

Large amounts of logic are required to create 64-bit, parallel comparators. Expanding the set of codes has a large, negative impact on the logic area and complexity required. The increase in size is counter productive to portability. The corresponding increase in the power consumption of the devices is detrimental for many portable wireless devices with limited power consumption requirements that are often the users of spread spectrum communications.

SUMMARY

An embodiment is a correlator with a multiplexer having a first input coupled to an incoming data stream, a second input and an output. A data register stores an incoming data stream having a number of candidate bits, the data register having an output coupled to the second input of the multiplexer. A code register is to store a known code having a predetermined number of code bits and a comparator is to compare a portion of the incoming data stream to a portion of the known code.

An embodiment is a method of correlating codes. The method receives an input data stream into a register and provides an output of the register to a multiplexer as a feedback stream. The multiplexer toggles between outputting a bit of the data stream to the register and outputting a bit of the feedback stream to the register resulting in an interleaved data stream in the register. A portion of the input data stream is compared to a portion of a known code generating a first result. The interleaved bits of the input data are shifted such that a second portion of the input data stream is provided. The second portion of the input data stream is compared to a second portion of the known code, generating a second result.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
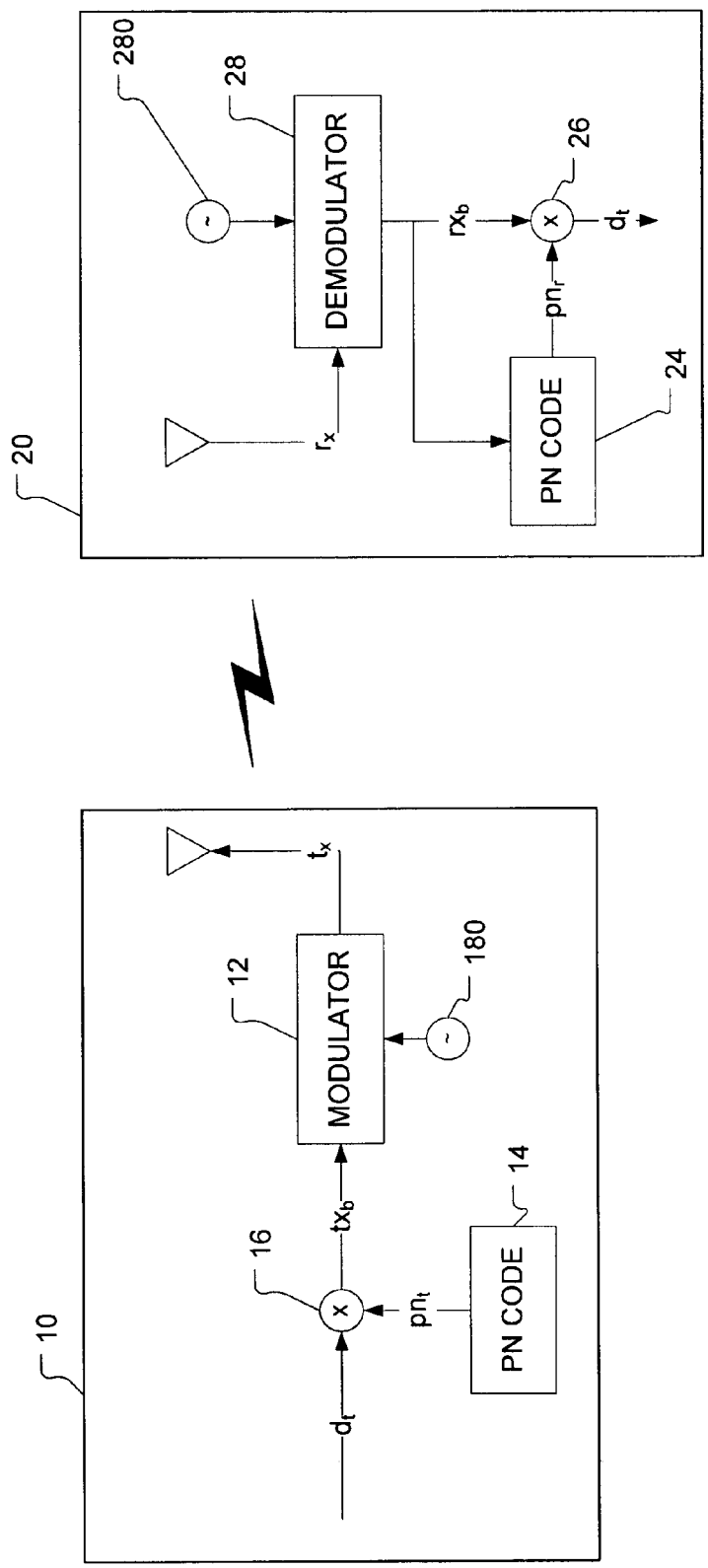
FIG. 1 shows an example of a wireless communication system employing pseudo-noise codes.

FIG. 1 shows a transmitter 10 that uses spread spectrum techniques to transmit input data $d_t$ to a receiver 20 as transmission data $t_x$. For a direct sequence spread spectrum system, shown here, the input data is multiplied at 16 by the pseudo-noise code sequence pseudo-noise$_t$ generated by the code generator 14. Multiplication may include convolution, or other methods of combining the transmission data with the pseudo-noise codes. This results in a transmission base band signal $tx_b$. The transmission base band signal is then modulated with modulator 12 to radio frequencies using RF input 180 and transmitted as tx.

A receiver 20 then receives the transmitted data as $r_x$ at the receiver module and demodulates it with demodulator 28 having RF input 280. The demodulated data $rx_b$ is then processed to extract the pseudo-noise code sequence pseudo-noise$_r$ at correlator 24 and this is then applied to the data at 26 to determine the output data $d_r$. The pseudo-noise code sequence pseudo-noise$_t$ must be the same as the pseudo-noise sequence pseudo-noise$_r$ or the communications will not work.

Currently, a receiver responds to a small set of known pseudo-noise codes using a dedicated hardware circuit such as 24, referred to here as a correlator. The correlator generally has storage for the reference codes. For a 64-bit pseudo-noise code, the match count output of the correlation function is generated by comparing a full 64-bit reference code against an over sampled received input stream and then counting the bit matches. The reference is generally compared at every clock against the previous 64-bit sample.

A conventional correlator uses a fully parallel bit compare and addition of a pseudo-noise code (PN Code) to the incoming data stream. The number of bits in the comparator is equal to the length of the PN-Code. A PN-code has a predetermined number, n, of bits, also referred to as chips. Each PN-code represents one data bit, with a match generally equaling a data value of 1 and no match equaling a data value of 0. Each chip of the PN-code is represented by a number of samples, m. For example, for a 64-chip PN-code being received at an oversampled rate of 6 that corresponds to one bit of data, m=6 and n=64. No limitation is intended nor should be implied as to the number of samples per chip, the number of chips per code, nor the number of bits of data.

A conventional digital correlator has a shift register of the PN-code size multiplied by the sampling rate. In one conventional solution the PN-code size is 64, and the rate is 6, giving 64*6 resulting in a 384 bit shift register. It has compare and addition logic for every bit or chip of the PN-Code, 64 chips in this example. The shift register would have a tap every six chips. After sampling every sixth sample, the bits would be shifted to the next bit and every sixth-plus-one chip would be provided for the comparison process.

It is important to note that a shift register is used to store the data stream history, and that a PN-code length worth of history is required for the correlation operation. For ease of discussion, the implementations will be simplified without oversampling. This is not intended to limit the scope of the embodiments of the invention or the claims, but is merely done to promote understanding of the invention.

Figure 2:
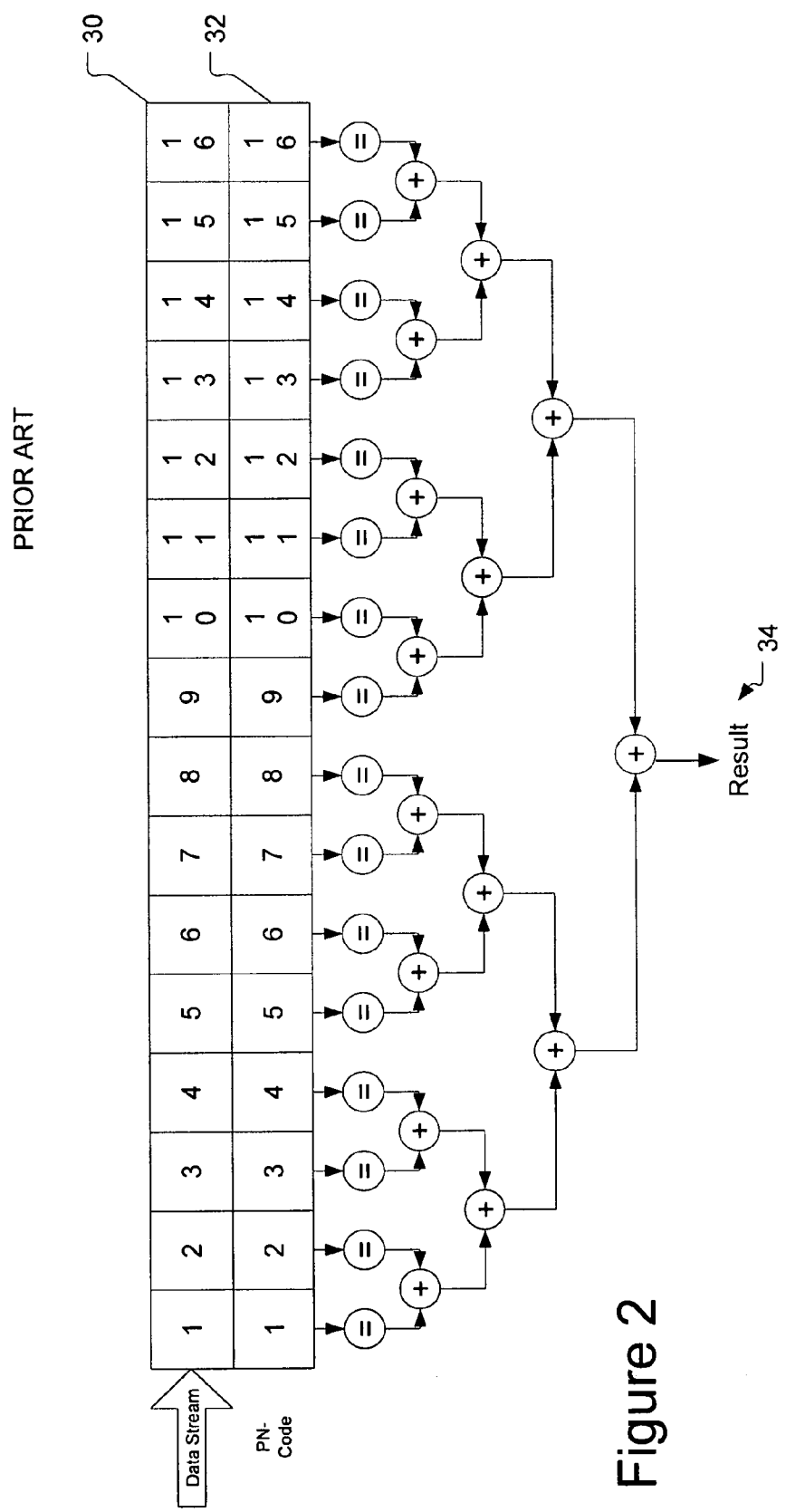
FIG. 2 shows a conventional pseudo-noise code correlator.

An example of a conventional correlator circuit is shown in FIG. 2. This correlator comprises a PN code register 32 having n-bits in length, and a data stream register 30 also having n-bits in length. Again, as mentioned above, the effects of oversampling will be disregarded for now. The code register or data stream register may be any kind of storage that allows the known PN code to be stored. References to register are not intended to imply that the code may only be stored in a register to apply the invention.

Each bit in the PN code register corresponds to an equivalent bit in the data stream register. Each pair of corresponding bits is compared and the outputs of comparison of adjacent pairs of compare function are summed. The results of the summation functions are then summed in a hierarchical fashion until a single result 34 is found. This process is time and power consuming, and requires a high number of logic gates, as can be seen in FIG. 2. This result is generally compared to a predetermined threshold to determine if the code is a 'hit' or a 'miss.' Due to the oversampling, such as 6 times oversampling discussed above, there are six complete 64-bit sequences that are candidates for matching, in this particular example.

As the two devices are asynchronous, it is hard to judge where the middle of a chip is during a data stream, one usually takes samples at a rate higher than the chip rate. For example, assume a chip rate of 1 megabits per second (mbs). Each chip is transmitted for 1 microsecond. Oversampling the data by 6 results in 6 samples per 1 microsecond. Sampling across the chip ensures that 1 of the samples is close enough to the center of the chip to allow the correlation process to proceed.

As mentioned above, conventional correlators have two issues for wireless devices. A main attraction of using wireless devices is their portability. Having to implement a large number of logic gates increases the size of the circuitry, which in turn increases the size of the device. Another challenge is in the power consumption. Each logic gate consumes power, increasing the overall power consumption of the device. As wireless devices are more desirable if they have no wires, including no power wires, high power consumption affects the battery life.

Figure 3:
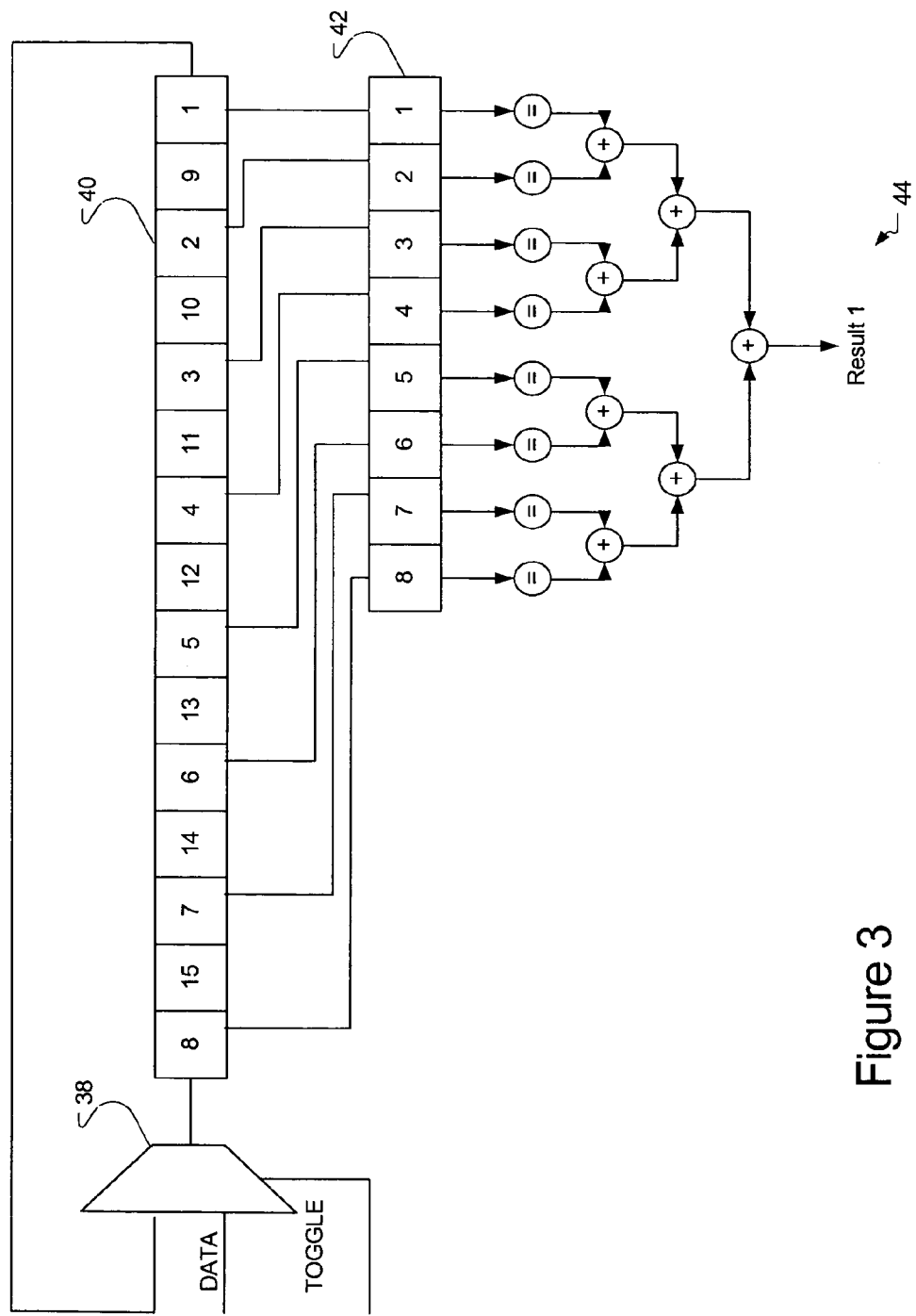
FIG. 3 shows an embodiment of a staged pseudo-noise correlator at a first stage.

An embodiment of an improved digital correlator is shown in FIG. 3. The improved correlator comprises a PN code register 42 having n-bits in length, and a data stream register also having n-bits in length. The storage referred to above used to store the 'reference' PN code against which the incoming data stream is compared may be the PN code register.

The correlator of FIG. 3 further comprises a feedback circuit 38, in this example a multiplexer, controlled by a toggle bit, where the feedback circuit selects between an input data stream and a feedback path from the data stream register. As the data is shifted across the data register 40, it is output to the input of the multiplexer. The feedback circuit then toggles between the data bits from the incoming data stream and the data bits from the output of the register. This results in an interleaved data stream. Ignoring the effects of oversampling, a 16-bit pattern would look similar to that shown in the data register 40 of FIG. 3. It must be noted that only half of the code register is shown here for ease of discussion.

Without taking into account any oversampling factors, the data register would normally have a tap every chip. In this implementation, the data register has a tap every two chips. The number of taps is proportional to the number of stages of the correlator. For an oversampled embodiment, there would be a tap for each multiple of the sampling rate times two. In the example of an oversampling rate of 6, there would be a tap every twelfth chip. The input data stream will be referred to here as having a number of candidate bits, the code register will have a known code having a predetermined number of code bits. The comparisons are done between portions of the input data stream and portions of the known code.

In the staged digital correlator of FIG. 3, the compare and addition operations are broken into stages, reducing the size of the compare and addition logic. In the staged digital correlator the incoming data stream is folded back upon itself so there is no need for multiplexing every bit. If the device is not folded upon itself, then a two input multiplexer and a select would be required for every bit in the PN-Code, because the correlator needs to compare every bit in the PN-code with the data stream. If the correlator compares one half of the code at a time, then code words are located in each half of the data stream. The folding operation relocates the codes in the datastream to be every other bit. Therefore, a single shift changes the code word. This is shown in FIG. 4.

Figure 4:
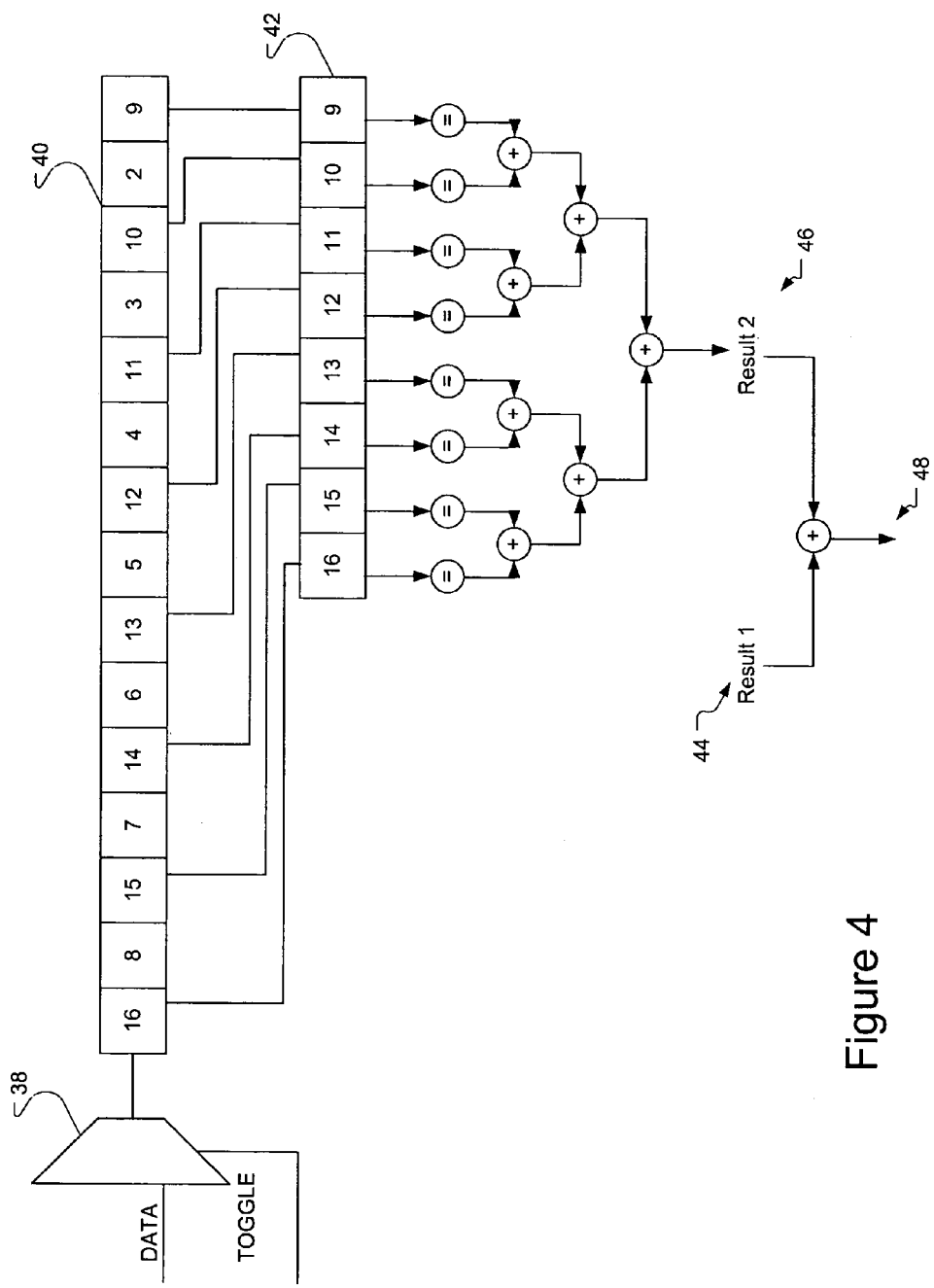
FIG. 4 shows an embodiment of a staged pseudo-noise correlator at a second stage.

In FIG. 4, a shift has occurred in the data register 40, as now the second portion of the code, bits 9-16 are in the registers having the taps. In addition, the shift register holding the known code 42 to align bits 9-16 with the data register contents being provided to the comparison logic. The known code may not be shifted, as there are many alternative methods of aligning the second half of the code with the shifted values in the data register.

For example, the traces connected to bits 1-8 and the traces connected to the bits 9-16 could be switched and the switching would provide the appropriate portion of the known code for comparison purposes. In another example, the register used for the comparison could be a buffer register of half the size of the code register, with half of the code being provided to it at any one time. The example of FIGS. 3 and 4 are only provided for understanding of the invention and are in now way intended to limit application of the invention.

The comparison logic of FIG. 3 used fewer levels of hierarchy to generate a first result. The comparison logic of FIG. 4 uses the same logic, so there is no increase in logic gates to generate the second result. The final result for a particular candidate code may be performed using the comparison logic already provided for the initial comparison.

The comparison logic of FIG. 3 used fewer levels of hierarchy to generate a first result 44. The comparison logic of FIG. 4 uses the same logic, so there is no increase in logic gates to generate the second result 46. The final result 48 for a particular candidate code may be performed using the comparison logic already provided for the initial comparison.

Figure 5:
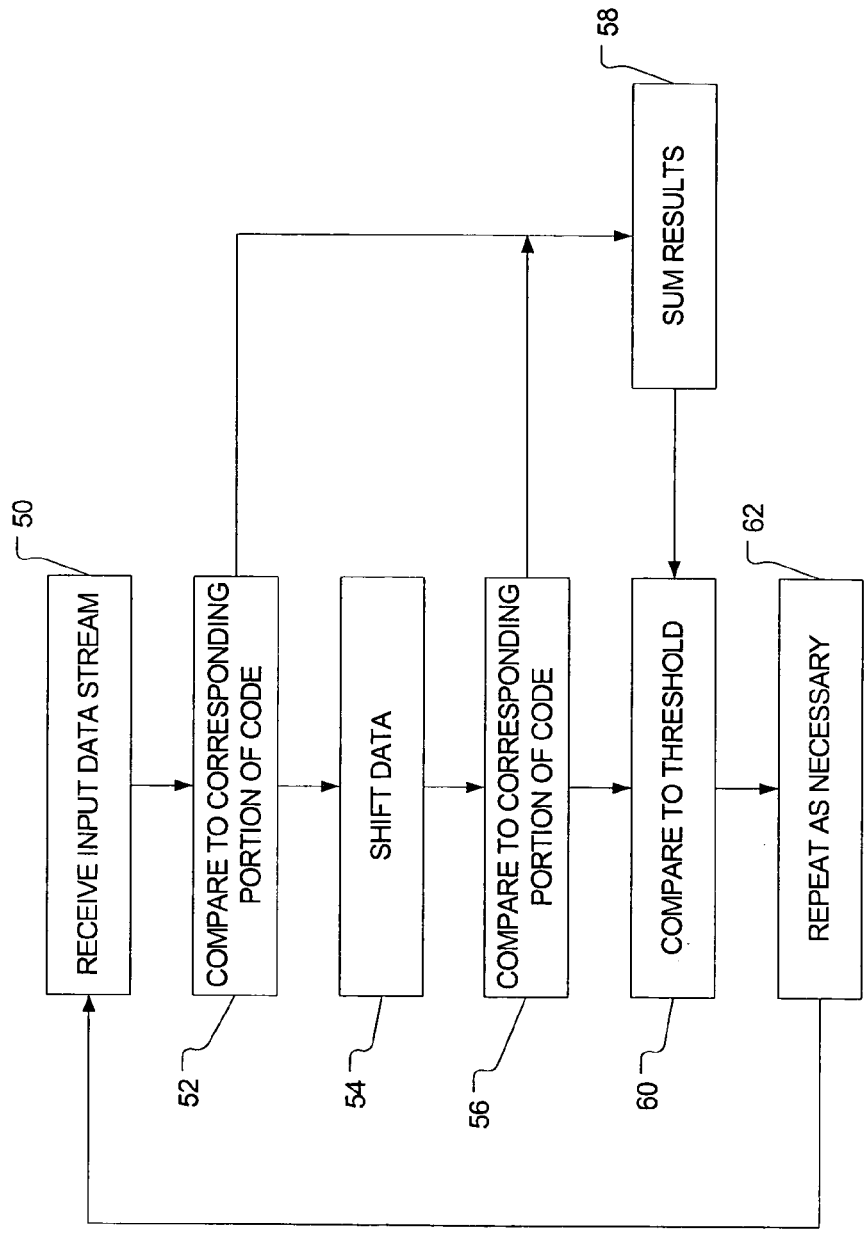
FIG. 5 shows a flowchart of an embodiment of a method of staged correlation of pseudo-noise codes.

An embodiment of the comparison process is shown in FIG. 5. At 50 the incoming data stream is received. As discussed above, the incoming data stream is more than likely an oversampled stream, where the number of samples taken is equal to the product of a code length and an oversampling rate.

At 52, a comparison is performed between corresponding portions of the two codes. In the example above, the first half of the candidate code is compared against the first half of the known code. It must be noted that the portion of the candidate code may be half the length of the known code, but may actually be a complete code. If the known code were actually two codes, the comparison is done between a first half of the candidate code, and a first of two known codes.

The results of the first comparison are stored in some fashion and then the data is shifted in the data register at 54. As discussed above, the shift may be a one-bit shift and result in the entire second portion of the code being available. If this were attempted with the candidate code remaining in sequence, the data would have to shift 8 places to provide the second half of the example 16-bit code.

At 56, the second comparison is performed. In the case of the stage comparing half of the known code the second result is summed with the first result generated by the first comparison at 58, resulting in a final result. If the two stages are used to compare two different codes that are half the length of the register, this final result in not needed.

At 60, the final result for this set of chips may be compared to a threshold. The threshold indicates whether or not enough of the bits of the known code and the candidate code match to indicate a match between the codes. For example, for a 64-bit code, it may be determined that a hit count of 60 results in a match, and anything under 60 would result in a 'miss' or not a match.

There may be two thresholds, one to indicate a match, a data value of 1, and one to indicate no match, a data value of 0. The region in between the two may be a 'no match' region that indicates that the data value is unknown.

With regard to the oversampling, the number of candidate codes is equal to the sampling rate. If the sampling rate is 4, then every fourth bit of the original data stream is part of one candidate code. If the first number of the pairs below indicates the candidate code number, and the second number is the bit within that code, the non-interleaved data would look like the following for a simplified 4-bit code:

1,1 2,1 3,1 4,1 1,2 2,2 3,2 4,2 |1,3 2,3 3,3 4,3 1,4 2,4 3,4 4,4 with the vertical bar marking a half code length. With taps every fourth bit, the four bits for each sample are acquired.

With the data interleaved among the codes, at the point in time of the second half of the code length being at the input of the multiplexer, the output of the data register would be available at the input as well. The data stream would then reside in the shift register as:

1,1 1,3 2,1 2,3 3,1 3,3 4,1 4,3 |1,2 1,4 2,2 2,4 3,2 3,4 4,2 4,4.

Placing taps every eighth bit, shown in bold, would result in the first half, bits 1 and 2, of the first candidate code, code 1, being available for the first compare process. A subsequent shift would provide bits 3 and 4 of the first candidate code.

If there were a miss on this code, a subsequent shift would result in the first and second bits of the second candidate code becoming available, bits 2,1 and 2,2. This process would continue as long as there is incoming data, the correlator just keeps shifting until it is turned off. While the embodiment of FIG. 5 assumes two stages, the addition of a new stage would merely add another set of compare and sum processes to the flowchart. The number of stages y can be equal to any value from 2 to $2^n$. More stages take more time, but use fewer gates, which is the tradeoff between the two choices.

Advantages of the improved digital correlator include that it uses a smaller die area than the conventional solution, and performs more functions. The improved digital correlator has a lower gate count and lower power consumption. Another advantage of the improved comparator is the ability to correlate against multiple codes. As mentioned above, instead of using the two stages to add together a correlation value, the codes could be tallied separately to decode against different codes. In one embodiment a two staged correlator could correlate one code of full length, or one code of half-length with double sampling, or two codes of half-length.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Thus, the claims following the detailed description are hereby expressly incorporated into this detailed description, with each claim standing on its own as a separate embodiment of this invention.

What is claimed is:

1. A correlator, comprising:
   a feedback circuit having a first input coupled to an incoming data stream, at least a second input and an output;
   a data register to store an incoming data stream having a number of candidate bits, the data register having an output coupled to the second input of the feedback circuit, the output to provide a feedback stream to the second input wherein the feedback circuit is configured to toggle between outputting a bit of the incoming data stream to the data register and outputting a bit of the feedback stream to the data register resulting in an interleaved data stream in the data register;
   a code register to store a known code having a predetermined number of code chips; and
   a comparator to compare a portion of the incoming data stream to a portion of the known code.

2. The correlator of claim 1, the data register further comprising a data register to store the incoming data stream as an oversampled stream.

3. The correlator of claim 2, the oversampled stream having a number of samples that is a product of an oversampling rate and the number of candidate bits.

4. The correlator of claim 1, the portion of the incoming data further comprising a portion of a complete code.

5. The correlator of claim 1, the portion of the incoming data stream further comprising a complete code.

6. The correlator of claim 5, the portion of the known code, further comprising a complete code, the known code being comprised of more than one complete code.

7. A method of correlating codes, comprising:
receiving an input data stream into a register;
providing an output of the register to a feedback circuit the output comprising a feedback stream;
toggling the feedback circuit between outputting a bit of the input data stream to the register and outputting a bit of the feedback stream to the register resulting in an interleaved data stream in the register;
comparing a first portion of the input data stream to a first portion of a known code;
generating a first result;
shifting the interleaved bits of the input data such that a second portion of the input data stream is provided;
comparing the second portion of the input data stream to a second portion of the known code; and
generating a second result.

8. The method of claim 7, receiving a data stream into a register further comprising receiving a number of samples of a data stream, wherein the number of samples is equal to the product of a code length and an oversampling rate.

9. The method of claim 7, comparing a first portion of the input data stream to a first portion of the known code further comprising comparing a portion of a candidate code to a first portion of the known code, the known code having more chips than the first portion.

10. The method of claim 9, comparing a second portion of the input data stream to a second portion of the known code further comprising comparing a second portion of a candidate code to a second portion of the known code.

11. The method of claim 7, comparing a first portion of the input data stream to a first portion of the known code further comprising comparing a first portion of the input data stream having a number of candidate code bits to a first complete known code.

12. The method of claim 11, comparing a second portion of the input data stream to a second portion of the known code further comprising comparing a second portion of the input data stream having a number of candidate bits to a second complete known code.

13. The method of claim 11, the method further comprising generating a final result from the first and second result.

14. The method of claim 13, the method further comprising comparing the final result to a threshold.

15. The method of claim 14, the method further comprising determining that the final result exceeds the threshold and storing a match indicator.

16. The method of claim 14, the method further comprising determining that the final result does not exceed the threshold and storing a miss indicator.

17. The method of claim 14, the method further comprising comparing a portion of the input data stream having a candidate code to a portion of a known code as many times as there are candidate codes in the input data stream.

18. A wireless receiver, comprising:
a receiver module to detect signal waves;
a demodulator to demodulate the signal waves into an input data stream; and
a correlator to compare the input data stream to a known code, the correlator further comprising:
a multiplexer having a first input coupled to an incoming data stream, a second input and an output;
a data register to store an incoming data stream having a number of candidate bits, the data register having an output couple to the second input of the multiplexer, the output to provide a feedback stream to the second input, wherein the multiplexer is configured to toggle between outputting a bit of the incoming data stream to the data register and outputting a bit of the feedback stream to the data register resulting in an interleaved data stream in the data register;
a code register to store a known code having a predetermined number of code bits; and
a comparator to compare a portion of the incoming data stream to a portion of the known code.

19. The receiver of claim 18, a portion of the incoming data stream further comprising a portion of the incoming data stream having a length equal to half a length of the known code.

20. The receiver of claim 18, a portion of the incoming data stream further comprising a portion of the incoming data stream having a length equal to a length of the known code, there being two known codes in the code register.

* * * * *